US006856431B2

(12) United States Patent
Ohta

(10) Patent No.: US 6,856,431 B2
(45) Date of Patent: Feb. 15, 2005

(54) METHOD AND APPARATUS FOR FACSIMILE TRANSMISSION CAPABLE OF EFFECTIVELY DECREASING COMMUNICATION COSTS

(75) Inventor: Naoki Ohta, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 905 days.

(21) Appl. No.: 09/783,052

(22) Filed: Feb. 13, 2001

(65) Prior Publication Data

US 2001/0030760 A1 Oct. 18, 2001

(30) Foreign Application Priority Data

Feb. 14, 2000 (JP) ...................................... 2000-035485

(51) Int. Cl.[7] ................................................ H04N 1/00
(52) U.S. Cl. ........................ 358/400; 358/407; 358/435; 358/440
(58) Field of Search ................................ 358/400, 405, 358/407, 426.02, 434, 435, 436, 438, 439, 440, 442, 443; 379/100.01, 100.12

(56) References Cited

U.S. PATENT DOCUMENTS

| 6,463,135 | B2 | * | 10/2002 | Abrishami et al. | .... | 379/100.01 |
| 2001/0026545 | A1 | * | 10/2001 | Matsumoto et al. | ........ | 370/338 |
| 2001/0033642 | A1 | * | 10/2001 | Abrishami et al. | .... | 379/100.01 |
| 2004/0117245 | A1 | * | 6/2004 | Gogerty | ...................... | 705/14 |

FOREIGN PATENT DOCUMENTS

| JP | 10107938 | 4/1998 | ............ H04N/1/00 |
| JP | 11055487 | 2/1999 | ............ H04N/1/32 |

* cited by examiner

Primary Examiner—Jerome Grant, II
(74) Attorney, Agent, or Firm—Cooper & Dunham LLP

(57) ABSTRACT

A gateway apparatus includes facsimile and Internet communications mechanisms, a memory, and a communications controller. The facsimile communications mechanism receives facsimile communications protocols and facsimile information from a calling facsimile apparatus through the telephone network. The Internet communications mechanism transmits the facsimile information in a packet format to a called facsimile apparatus via a different gateway apparatus through the Internet and the telephone network. The memory stores data representing a calling facsimile number of the calling facsimile apparatus in association with a called facsimile number of the called facsimile apparatus. The communications controller determines before establishing a line connection whether the facsimile number of the calling facsimile apparatus is registered. The communications controller causes the different gateway apparatus to initiate a call to the called facsimile apparatus using the called facsimile number when the facsimile number of the calling facsimile apparatus is determined as registered. The communications controller establishes a line connection upon a receipt of an acknowledgement indicating the line is connectable.

25 Claims, 3 Drawing Sheets

METHOD AND APPARATUS FOR FACSIMILE TRANSMISSION CAPABLE OF EFFECTIVELY DECREASING COMMUNICATION COSTS

BACKGROUND

1. Field

This patent specification relates to a method and apparatus for Internet facsimile transmission, and more particularly to a method and apparatus for Internet facsimile transmission that can effectively decrease communication costs.

2. Description of the Related Arts

Transmission of image data is widely used through equipment such as facsimile machines or data communications terminals such as PCs (personal computer) coupled through a public switched telephone network (PSTN). For such image data transmission, a user typically pays charges determined in accordance with communication time and distance. Usually, the longer the call distance, the higher the charge.

The Internet is a newcomer of the communication and brings a new charge system that usually is not based on call distance. Accordingly, a system that uses the Internet for facsimile transmission has recently been developed. More specifically, a facsimile transmission between two data communications terminals such as facsimile machines is relayed through the Internet using gateway terminals. The major portion of the call distance is thereby covered by the Internet and the PSTN is only used between the facsimile machine and the gateway. The communication costs will accordingly be decreased.

Published Japanese Unexamined Applications, No. 10-107938 and No. 11-55487, describe examples of the above system.

The conventional Internet facsimile system, however, has a drawback. For example, in a real-time-type Internet facsimile system, a user is charged even when a facsimile transmission has failed. More specifically, a line connection between a calling facsimile machine and a gateway terminal is established when the gateway terminal accepts a call sent from the calling facsimile machine, regardless of whether a called facsimile machine can accept the call or not. For example, when the called facsimile machine is busy, the gateway terminal will fail in establishing the line connection. In this case, the user will be charged for a time fee of the communication between the calling facsimile machine and the gateway.

SUMMARY

This patent specification discloses a novel gateway apparatus coupled to a public switched telephone network and the Internet. In one example, a novel gateway apparatus includes a facsimile communications mechanism, an Internet communications mechanism, a memory, and a communications controller. The facsimile communications mechanism is configured to receive facsimile communications protocols and facsimile information from a calling facsimile apparatus coupled to the telephone network through the telephone network. The Internet communications mechanism is configured to transmit the facsimile information in a packet format to a called facsimile apparatus coupled to the telephone network via a different gateway apparatus through the Internet and the telephone network. The memory stores data representing a calling facsimile number of the calling facsimile apparatus in association with a called facsimile number of the called facsimile apparatus. The communications controller is configured to determine before establishing a line connection with the calling facsimile apparatus whether the facsimile number of the calling facsimile apparatus is registered in the memory as the calling facsimile number. The communications controller is further configured to cause the different gateway apparatus to initiate a call to the called facsimile apparatus using the called facsimile number when the facsimile number of the calling facsimile apparatus is determined as registered in the memory as the calling facsimile number. The communications controller is further configured to establish a line connection upon a receipt of an acknowledgement indicating the line is connectable from the called facsimile apparatus.

The data stored in the memory may represent the calling facsimile number of the calling facsimile apparatus in association with a plurality of called facsimile numbers including the facsimile number of the called facsimile apparatus. Each of the facsimile numbers is previously designated with a time parameter. Further, the communications controller may select facsimile numbers from among the plurality of the called facsimile numbers based on the time parameter and additional time information corresponding to the time parameter so as to cause the different gateway apparatus to initiate a call to facsimile apparatuses using the selected facsimile numbers.

The time parameter may include arbitrary transmission start and arbitrary transmission completion times and the additional time information includes a call acceptance time.

The communications controller may perform a new registration and change the contents of registration in the memory in accordance with an instruction from the calling facsimile apparatus.

The facsimile communications protocols may include G3 facsimile protocols and the packet format may include a TCP/IP packet format.

The disclosed system further provides a novel method of transmitting facsimile information from a calling facsimile apparatus to a called facsimile apparatus through the Internet using a packet format. In one example, a novel method includes the steps of storing, receiving, determining, initiating, and establishing. The storing step stores data representing a calling facsimile number of a calling facsimile apparatus in association with a called facsimile number of a called facsimile apparatus. The receiving step receives a call from the calling facsimile apparatus. In this case, the call includes facsimile communications protocols. The determining step determines before establishing a line connection with the calling facsimile apparatus whether the facsimile number of the calling facsimile apparatus is registered as the calling facsimile number in the storing step. The initiating step initiates a call to the called facsimile apparatus using the called facsimile number when the facsimile number of the calling facsimile apparatus is determined as registered in the storing step as the calling facsimile number. The establishing step establishes a line connection upon a receipt of an acknowledgement indicating the line is connectable from the called facsimile apparatus.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
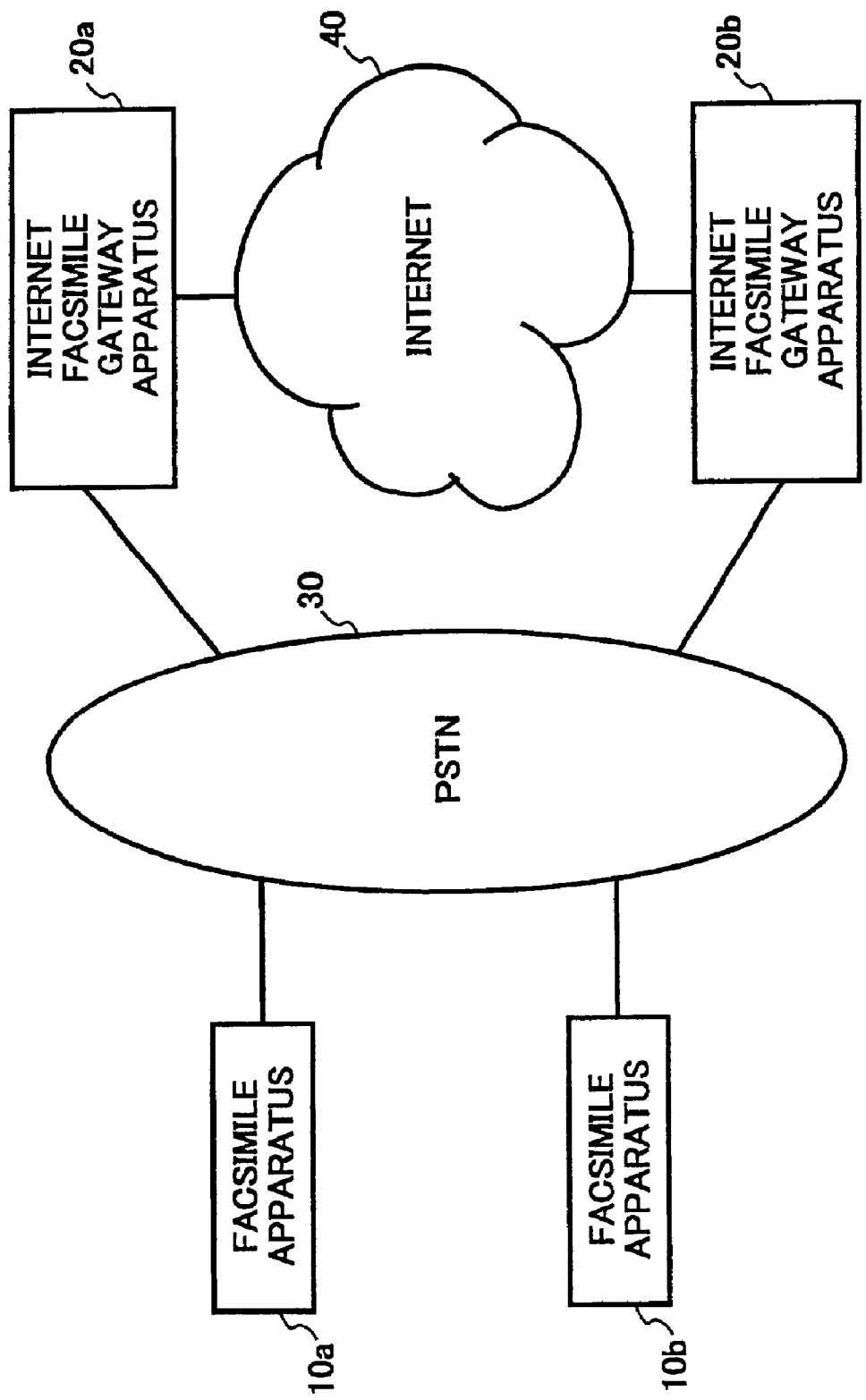
FIG. 1 is a schematic block diagram of a real-time-type Internet facsimile system according to a preferred embodiment.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numeral designate identical or corresponding parts throughout the several views, particularly to FIG. 1, a real-time-type Internet facsimile system 100 according to a preferred embodiment is described. A real-time-type Internet facsimile system 100 includes a group of facsimile apparatuses and a group of Internet facsimile gateway apparatuses. In FIG. 1, for the sake of simplicity, facsimile apparatuses 10a and 10b represent the above group of facsimile apparatuses and Internet facsimile gateway apparatuses 20a and 20b represent the above group of Internet facsimile gateway apparatuses.

As shown in FIG. 1, each of the facsimile apparatuses 10a and 10b is coupled to a public switched telephone network (PSTN) 30 and performs a facsimile communications operation (i.e., a Group 3 facsimile operation) for transmitting and receiving facsimile information to and from a different facsimile machine coupled to the above PSTN 30 through the PSTN 30. Each of the Internet facsimile gateway apparatuses 20a and 20b is coupled to the PSTN 30 and the Internet indicated by reference numeral 40.

Figure 2:
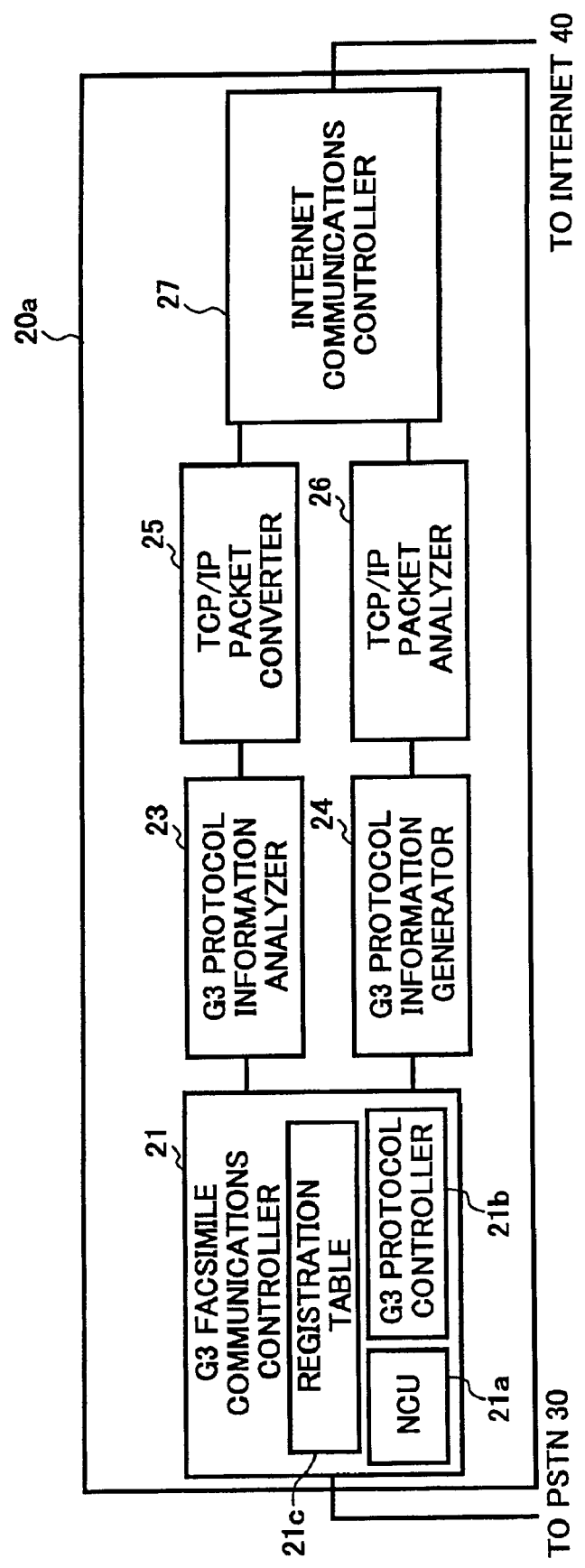
FIG. 2 is a schematic block diagram of an Internet facsimile gateway apparatus included in the real-time-type Internet facsimile system of FIG. 1.

FIG. 2 shows a block diagram of the Internet facsimile gateway apparatus 20a, which is also applied to the Internet facsimile gateway apparatus 20b. As shown in FIG. 2, the Internet facsimile gateway apparatus 20a includes a G3 (Group 3) communications controller 21, a G3 (Group 3) protocol information analyzer 23, a G3 (Group 3) protocol information generator 24, a TCP/IP (transmission control protocol/Internet protocol) packet converter 25, a TCP/IP (transmission control protocol/Internet protocol) packet analyzer 26, and an Internet communications controller 27.

The G3 facsimile communications controller 21 includes a NCU (network control unit) 21a for connecting to the PSTN 30 and a G3 (Group 3) protocol controller 21b for executing a communications control according to a G3 (Group 3) facsimile communications protocol. The G3 facsimile communications controller 21 further includes a memory referred to as a registration table 21c, explained later. The G3 facsimile communications controller 21 performs the G3 transmission and receiving operation by controlling the NCU 21a and the G3 protocol controller 21b. The G3 protocol information analyzer 23 analyzes G3 protocol information such as communications procedure signals which the communications controller 21 has received from a different facsimile machine through the PSTN 30. The TCP/IP packet converter 25 converts the G3 protocol information analyzed by the G3 protocol information analyzer 23 into packet information referred to as a TCP/IP packet so that the G3 protocol information is transmittable to the above different facsimile machine through the Internet 40. The Internet communications controller 27 controls a connection to the Internet 40 to transmit information converted and prepared by the TCP/IP packet converter 25 to other facsimile machines and to receive information sent from other facsimile machines through the Internet 40. The TCP/IP packet analyzer 26 analyzes packet information contained in a TCP/IP packet which the communications controller 27 has received from a different facsimile machine through the Internet 40. The G3 protocol information generator 24 generates, based on the packet information analyzed by the TCP/IP packet analyzer 26, protocol information such that the G3 facsimile communications controller 21 can send it to a different facsimile machine through the PSTN 30.

Thus, the Internet facsimile gateway apparatuses 20a and 20b are configured to analyze and convert information so as to perform data communications between the PSTN 30 and the Internet 40. In each of the Internet facsimile gateway apparatuses 20a and 20b, formation sent from the PSTN 30 is transferred to the G3 facsimile communications controller 21, the G3 protocol information analyzer 23, the TCP/IP packet converter 25, and the Internet communications controller 27 in this order, and is output to the Internet 40. On the other hand, information sent from the Internet 40 is transferred to the Internet communications controller 27, the TCP/IP packet analyzer 26, the G3 protocol information generator 24, and the G3 facsimile communications controller 21 in this order, and is output to the PSTN 30.

With the above configuration, the real-time-type Internet facsimile system 100 performs the facsimile communications operation via the Internet 40 in real time between the facsimile apparatuses 10a and 10b.

In the real-time-type Internet facsimile system 100, when sending facsimile information to the facsimile apparatus 10b, for example, the facsimile apparatus 10a first initiates a facsimile call to the Internet facsimile gateway apparatus 20a via the PSTN 30 which will then accept the facsimile call and return a tone signal. Thereby, connection of the line between the facsimile apparatus 10a and the Internet facsimile gateway apparatus 20a is established via the PSTN 30. After the establishment of the above line connection, the facsimile apparatus 10a requests transmission of facsimile information to the facsimile apparatus 10b by sending a user identification and a destination facsimile number to the Internet facsimile gateway apparatus 20a. The user identification is given by a communications service provider associated with the PSTN 30. The destination facsimile number represents the facsimile number of the facsimile apparatus 10b and is entered by an operator on the facsimile apparatus 10a.

The Internet facsimile gateway apparatus 20a sends through the Internet 40 a call to an Internet facsimile gateway apparatus that handles communications in a local area corresponding to the above destination facsimile number. In this case, the Internet facsimile gateway apparatus 20a sends the call to the Internet facsimile gateway apparatus 20b which will then send a call to a facsimile apparatus through the PSTN 30 using the destination facsimile number. In this case, the thus-called facsimile apparatus is the facsimile apparatus 10b. Thereby, a communications path between the facsimile apparatuses 10a and 10b via the PSTN 30 and the Internet 40 is established.

Figure 3:
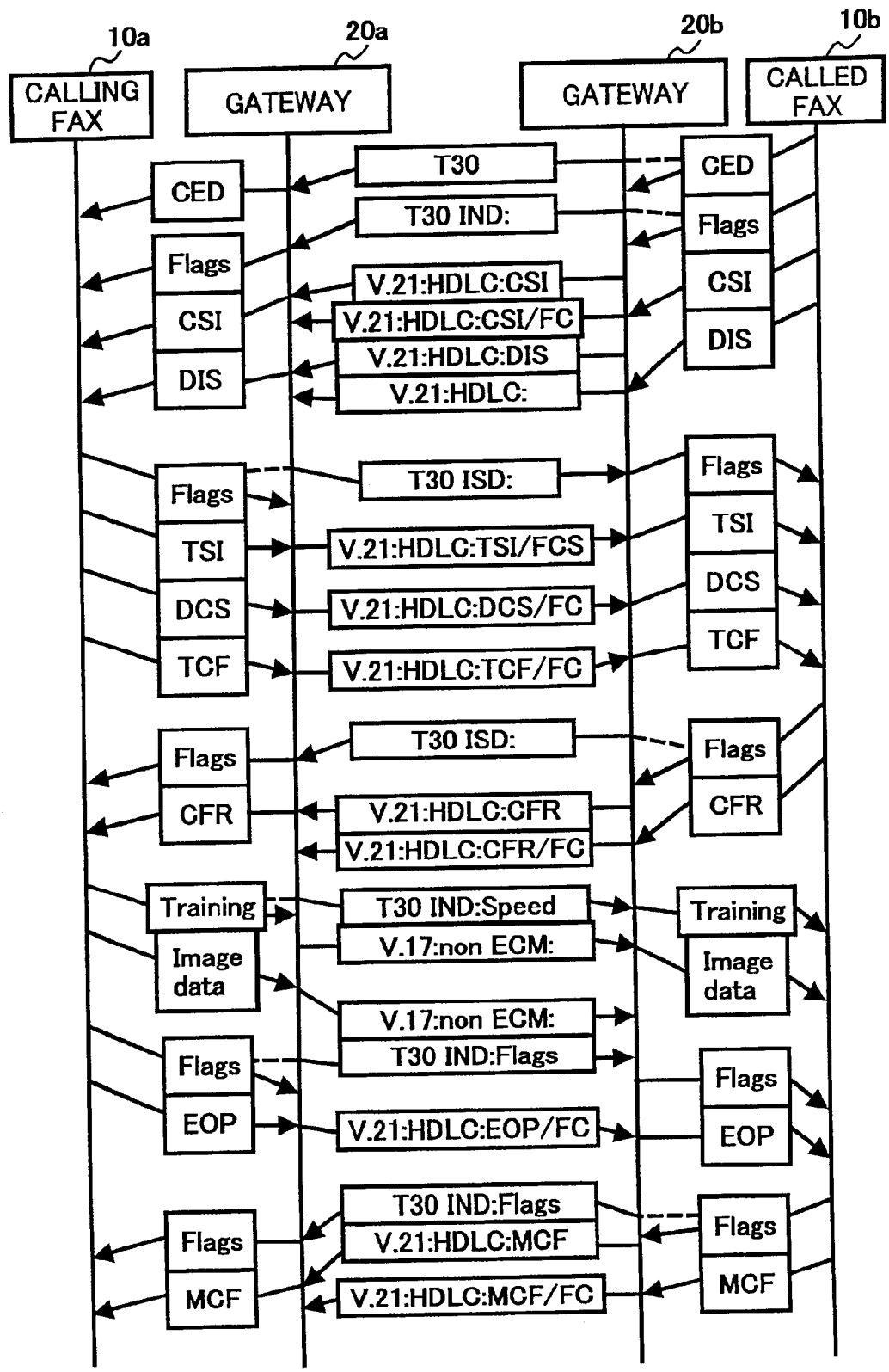
FIG. 3 is a sequence chart of a standard communications procedure performed by the real-time-type Internet facsimile system of FIG. 1.

After that, facsimile information and facsimile communications protocols are exchanged between the facsimile apparatus 10a and the Internet facsimile gateway apparatus 20a via the PSTN 30 and between the facsimile apparatus 10b and the Internet facsimile gateway apparatus 20b via the PSTN 30, according to a standard G3 facsimile procedure such as a recommendation T.30 of ITU-T (International Telecommunication Union Telecommunication Standardization Sector), as shown in FIG. 3. At the same time, the Internet facsimile gateway apparatus 20a converts information transmitted from the facsimile apparatus 10a through the facsimile communications protocols into TCP/IP packet information which includes an identifier and is transmittable through the Internet 40. On the other hand, the Internet facsimile gateway apparatus 20b converts the TCP/IP packet information transmitted from the Internet facsimile gateway apparatus 20a through the Internet 40 back into the original information which is then transmitted to the facsimile apparatus 10b through the PSTN 30. Thus, the real-time-type Internet facsimile system 100 performs the facsimile communications between the facsimile apparatuses 10a and 10b via the Internet 40.

To make the above operation possible, the Internet facsimile gateway apparatus 20a is configured to use communications services provided by the communications service provider associated with the PSTN 30. By using such communications services, the Internet facsimile gateway apparatus 20a can receive a notification, for example, for notifying a calling number from the PSTN 30 in connection with a facsimile transmission request from a facsimile machine. Also, in the Internet facsimile gateway apparatus 20a, a plurality of facsimile communications couples for performing the facsimile communications using the real-time-type Internet facsimile system 100 are previously registered in the registration table 21c of the G3 facsimile communications controller 21. Each of the facsimile communications couples includes a calling facsimile number and one or more called facsimile numbers. With the above configuration, the Internet facsimile gateway apparatus 20a can select called facsimile numbers using the registration table 21c according to the calling facsimile number notified from the PSTN.

In the example being explained, for example, the facsimile number of the facsimile apparatus 10a is registered as the calling facsimile number in one of the facsimile communications couples in the registration table 21c. As the called facsimile number in association with the above calling facsimile number of the facsimile apparatus 10a, one or more facsimile numbers can be registered. That is, when the facsimile apparatus 10a performs the facsimile transmission relative always to the facsimile apparatus 10b, for example, the facsimile number of the facsimile apparatus 10b is simply registered as the called facsimile number in connection with the calling facsimile number of the facsimile apparatus 10a in the registration table 21c.

On the other hand, when a plurality of facsimile numbers are registered as the called facsimile number in association with the calling number of the facsimile apparatus 10a, each of the plurality of facsimile numbers is registered in connection with a time parameter. In this case, the time parameter is set to data representing arbitrary transmission start and arbitrary transmission completion times in 24 hours, for example. Further, when the G3 facsimile communications controller 21 of the Internet facsimile gateway apparatus 20a receives a request for the facsimile transmission sent from the facsimile apparatus 10a, the G3 facsimile communications controller 21 performs an automatic number selection operation according to a time at which the G3 facsimile communications controller 21 accepts this request for the facsimile transmission. This time at which the G3 facsimile communications controller 21 accepts the request for the facsimile transmission is referred to as a call acceptance time.

In the above automatic number selection operation, the G3 facsimile communications controller 21 compares the call acceptance time with the above time parameters. Based on the comparison result, the G3 facsimile communications controller 21 selects appropriate facsimile numbers from among the plurality of the registered called facsimile numbers. In this way, the G3 facsimile communications controller 21 allows registration of arbitrary numbers of the called facsimile numbers which can flexibly be switched according to the above time parameters without requiring the fixed called facsimile numbers. That is, the G3 facsimile communications controller 21 of the Internet facsimile gateway apparatus 20a automatically selects the called facsimile numbers according to the time of operation for the facsimile transmission executed on the facsimile apparatus 10a. By using this feature, the operator can intentionally choose the time of operation for the facsimile transmission on the facsimile apparatus 10a so as to select the called facsimile numbers.

The above time parameter may be set to data based on date, month, and year, for example.

The registration of the above facsimile communications couple of the calling facsimile number and the called facsimile numbers into the registration table 21c can be made by the communications service provider based on the information provided by the user on a contract for applying the communications service. The user may also register by himself the above facsimile communications couple of the calling facsimile number and the called facsimile number into the registration table 21c by accessing a provider's home page on the Internet. In this case, the user can execute a new registration or a change of the registration afterwards using a password, with a PC (personal computer) or the facsimile apparatus which is provided with a function for performing the registration. Therefore, it is possible for the user to register at a later time an additional facsimile number on a needed-basis. With this configuration, the user can perform the facsimile transmission relative to any destination facsimile machines without fixing them.

When later registering an additional facsimile number on a needed-basis, the user can handle this operation as a tentative registration by registering the additional facsimile number in association with a designated transmission time, for example.

Upon a receipt of a call from the facsimile apparatus 10a through the PSTN 30, the G3 facsimile communications controller 21 of the Internet facsimile gateway apparatus 20a checks if the calling facsimile number associated with the received call is registered as the calling facsimile number in the registration table 21c, before accepting the call to establish the line connection. If the calling facsimile number of the facsimile apparatus 10a is determined as registered in the registration table 21c, the G3 facsimile communications controller 21 of the Internet facsimile gateway apparatus 20a accepts the call but does not perform the line connection yet. After that, the G3 facsimile communications controller 21 reads the called facsimile numbers associated with the calling facsimile number of the facsimile apparatus 10a. At this time, if only one facsimile number, for example, the facsimile number of the facsimile apparatus 10b is registered, the G3 facsimile communications controller 21 of the Internet facsimile gateway apparatus 20a passes that facsimile number to the Internet communications controller 27, with leaving the line unconnected yet. Also, if a plurality of facsimile numbers are registered and among which only one facsimile number, for example, the facsimile number of the facsimile apparatus 10b is registered as associated with the time parameters within which the call acceptance time is included, the G3 communications controller 21 of the Internet facsimile gateway apparatus 20a passes the facsimile number of the facsimile apparatus 10b to the Internet communications controller 27, with leaving the line unconnected yet.

Then, the Internet communications controller 27 of the Internet facsimile gateway apparatus 20a establishes the line connection and starts the control of the facsimile communications procedure through the Internet.

In the above procedure, the Internet facsimile gateway apparatus 20a sends a call to the Internet facsimile gateway apparatus 20b corresponding to the called facsimile number of the facsimile apparatus 10b which will then return an acknowledgement signal to the Internet communications controller 27 of the Internet facsimile gateway apparatus 20a via the Internet facsimile gateway apparatus 20b.

The Internet communications controller 27 of the Internet facsimile gateway apparatus 20a then passes the above acknowledgement signal from the facsimile apparatus 10b to the G3 facsimile communications controller 21. The facsimile communications controller 21 determines whether the above acknowledgement signal includes G3 protocol information indicating that the line is connectable or non-connectable (i.e., the line is busy). If the acknowledgement signal is determined as including the G3 protocol information indicating that the line is connectable, the facsimile communications controller 21 of the Internet facsimile gateway apparatus 20a connects the line to the facsimile apparatus 10a through the PSTN 30. Thereby, in the real-time-type Internet facsimile system 100, the Internet facsimile gateway apparatus 20a establishes the Internet facsimile communications path. In this Internet facsimile communications path, the facsimile apparatus 10a is connected to the Internet facsimile gateway 20a via the PSTN 30, the Internet facsimile gateway apparatus 20a is connected to the Internet facsimile gateway apparatus 20b via the Internet 40, and the Internet facsimile gateway apparatus 20b is connected to the facsimile apparatus 10b via the PSTN 30.

After that, the transmission of facsimile information is performed in a standard manner of the conventional real-time-type Internet facsimile system, as shown in FIG. 3.

On the other hand, if the acknowledgement signal is determined as including the G3 protocol information indicating that the line is non-connectable (i.e., the line is busy), the facsimile communications controller 21 of the Internet facsimile gateway apparatus 20a does not connect the line to the facsimile apparatus 10a and terminates the procedure.

The facsimile apparatus 10a may afterwards send a retry call with a retry call function, for example, to the same called number using the real-time-type Internet facsimile system 100. Upon a receipt of such retry call, the facsimile communications controller 21 of the Internet facsimile gateway apparatus 20a may again execute the above-described procedure.

In this way, the real-time-type Internet facsimile system 100 can avoid a problem in which the user is charged for a failed connection. Specifically, the G3 facsimile communications controller 21 of the Internet facsimile gateway apparatus 10a holds the line to the calling facsimile apparatus 10a unconnected when a facsimile transmission has failed, that is, when the line between the Internet facsimile gateway apparatus 20b and the called facsimile apparatus 10b is not connectable.

Thereby, the cost of the communications using the Internet can be decreased.

In this way, the real-time-type Internet facsimile system 100 can allow a low cost facsimile transmission between arbitrary facsimile apparatuses.

In the above description, the facsimile apparatuses 10a and 10b are described as the calling facsimile apparatus and the called facsimile apparatus, respectively, but their roles can be switched without causing any different result. Accordingly, the Internet facsimile gateway apparatuses 20a and 20b can also exchange their roles without causing any different result.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The disclosed system may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosed system may be implemented other than as specifically described herein.

This application claims priority to Japanese patent application No. JPAP2000-035485 filed on Feb. 14, 2000 in the Japanese Patent Office, the entire contents of which are hereby incorporated by reference.

What is claimed as new and is desired to be secured by Letter Patent of the United States is:

1. A gateway apparatus connected to a telephone network and the Internet, comprising:

a facsimile communications mechanism configured to receive facsimile communications protocols and facsimile information from a calling facsimile apparatus coupled to said telephone network through said telephone network;

an Internet communications mechanism configured to transmit said facsimile information in a packet format to a called facsimile apparatus coupled to said telephone network via a different gateway apparatus through the Internet and the telephone network;

a memory storing data representing a calling facsimile number of said calling facsimile apparatus in association with a called facsimile number of said called facsimile apparatus; and a communications controller configured to determine before establishing a line connection with said calling facsimile apparatus whether said facsimile number of said calling facsimile apparatus is registered in said memory as the calling facsimile number, to cause said different gateway apparatus to initiate a call to said called facsimile apparatus using said called facsimile number when said facsimile number of said calling facsimile apparatus is determined as registered in said memory as the calling facsimile number, and to establish a line connection upon a receipt of an acknowledgement indicating the line is connectable from said called facsimile apparatus.

2. A gateway apparatus as defined in claim 1, wherein said data stored in said memory represents said calling facsimile number of said calling facsimile apparatus in association with a plurality of called facsimile numbers including the facsimile number of said called facsimile apparatus, each of said facsimile numbers being previously designated with a time parameter, and said communications controller selects facsimile numbers from among said plurality of said called facsimile numbers based on said time parameter and additional time information corresponding to said time parameter so as to cause said different gateway apparatus to initiate a call to facsimile apparatuses using said selected facsimile numbers.

3. A gateway apparatus as defined in claim 2, wherein said time parameter includes arbitrary transmission start and arbitrary transmission completion times and said additional time information includes a call acceptance time.

4. A gateway apparatus as defined in claim 1, wherein said communications controller performs a new registration and changes the contents of registration in said memory in accordance with an instruction from said calling facsimile apparatus.

5. A gateway apparatus as defined in claim 1, wherein said facsimile communications protocols includes G3 facsimile protocols.

6. A gateway apparatus as defined in claim 1, wherein said packet format includes a TCP/IP packet format.

7. A gateway apparatus connected to a telephone network and the Internet, comprising:

facsimile communications means for receiving facsimile communications protocols and facsimile information from a calling facsimile apparatus coupled to said telephone network through said telephone network;

Internet communications means for transmitting said facsimile information in a packet format to a called facsimile apparatus coupled to said telephone network via a different gateway apparatus through the Internet and the telephone network;

storing means for storing data representing a calling facsimile number of said calling facsimile apparatus in association with a called facsimile number of said called facsimile apparatus; and communications controlling means for determining before establishing a line connection with said calling facsimile apparatus whether said facsimile number of said calling facsimile apparatus is registered in said storing means as the calling facsimile number, causing said different gateway apparatus to initiate a call to said called facsimile apparatus using said called facsimile number when said facsimile number of said calling facsimile apparatus is determined as registered in said storing means as the calling facsimile number, and establishing a line connection upon a receipt of an acknowledgement indicating the line is connectable from said called facsimile apparatus.

8. A gateway apparatus as defined in claim 7, wherein said data stored in said storing means represents said calling facsimile number of said calling facsimile apparatus in association with a plurality of called facsimile numbers including the facsimile number of said called facsimile apparatus, each of said facsimile numbers being previously designated with a time parameter, and said communications controlling means selects facsimile numbers from among said plurality of said called facsimile numbers based on said time parameter and additional time information corresponding to said time parameter so as to cause said different gateway apparatus to initiate a call to facsimile apparatuses using said selected facsimile numbers.

9. A gateway apparatus as defined in claim 8, wherein said time parameter includes arbitrary transmission start and arbitrary transmission completion times and said additional time information includes a call acceptance time.

10. A gateway apparatus as defined in claim 7, wherein said communications controlling means performs a new registration and changes the contents of registration in said storing means in accordance with an instruction from said calling facsimile apparatus.

11. A gateway apparatus as defined in claim 7, wherein said facsimile communications protocols includes G3 facsimile protocols.

12. A gateway apparatus as defined in claim 7, wherein said packet format includes a TCP/IP packet format.

13. A method of transmitting facsimile information from a calling facsimile apparatus to a called facsimile apparatus through the Internet using a packet format, comprising the steps of:

storing data representing a calling facsimile number of a calling facsimile apparatus in association with a called facsimile number of a called facsimile apparatus;

receiving a call from said calling facsimile apparatus, said call including facsimile communications protocols;

determining before establishing a line connection with said calling facsimile apparatus whether said facsimile number of said calling facsimile apparatus is registered as the calling facsimile number in said storing step;

initiating a call to said called facsimile apparatus using said called facsimile number when said facsimile number of said calling facsimile apparatus is determined as registered in said storing step as the calling facsimile number; and establishing a line connection upon a receipt of an acknowledgement indicating the line is connectable from said called facsimile apparatus.

14. A method as defined in claim 13, wherein said data stored in said storing step represents said calling facsimile number of said calling facsimile apparatus in association with a plurality of called facsimile numbers including the facsimile number of said called facsimile apparatus, each of said facsimile numbers being previously designated with a time parameter, said method further comprises a selecting step for selecting facsimile numbers from among said plurality of said called facsimile numbers based on said time parameter and additional time information corresponding to said time parameter so as to initiate a call to facsimile apparatuses using said selected facsimile numbers.

15. A method as defined in claim 14, wherein said time parameter includes arbitrary transmission start and arbitrary transmission completion times and said additional time information includes a call acceptance time.

16. A method as defined in claim 13, wherein said storing step is performed in accordance with an instruction from said calling facsimile apparatus.

17. A method as defined in claim 13, wherein said facsimile communications protocols includes G3 facsimile protocols.

18. A method as defined in claim 13, wherein said packet format includes a TCP/IP packet format.

19. An Internet facsimile system, comprising:

a gateway apparatus connected to a telephone network and the Internet, said gateway apparatus comprising:

a facsimile communications mechanism configured to receive facsimile communications protocols and facsimile information from a calling facsimile apparatus coupled to said telephone network through said telephone network;

an Internet communications mechanism configured to transmit said facsimile information in a packet format to a called facsimile apparatus coupled to said telephone network via a different gateway apparatus through the Internet and the telephone network;

a memory storing data representing a calling facsimile number of said calling facsimile apparatus in association with a called facsimile number of said called facsimile apparatus; and a communications controller configured to determine before establishing a line connection with said calling facsimile apparatus whether said facsimile number of said calling facsimile apparatus is registered in said memory as the calling facsimile number, to cause said different gateway apparatus to initiate a call to said called facsimile apparatus using said called facsimile number when said facsimile number of said calling facsimile apparatus is determined as registered in said memory as the calling facsimile number, and to establish a line connection upon a receipt of an acknowledgement indicating the line is connectable from said called facsimile apparatus.

20. A system as defined in claim 19, wherein said data stored in said memory represents said calling facsimile number of said calling facsimile apparatus in association with a plurality of called facsimile numbers including the facsimile number of said called facsimile apparatus, each of said facsimile numbers being previously designated with a time parameter, and said communications controller selects facsimile numbers from among said plurality of said called facsimile numbers based on said time parameter and additional time information corresponding to said time parameter so as to cause said different gateway apparatus to initiate a call to facsimile apparatuses using said selected facsimile numbers.

21. A system as defined in claim 20, wherein said time parameter includes arbitrary transmission start and arbitrary transmission completion times and said additional time information includes a call acceptance time.

22. A system as defined in claim 19, wherein said communications controller performs a new registration and changes the contents of registration in said memory in accordance with an instruction from said calling facsimile apparatus.

23. A system as defined in claim 19, wherein said facsimile communications protocols includes G3 facsimile protocols.

24. A system as defined in claim 19, wherein said packet format includes a TCP/IP packet format.

25. A computer readable medium storing computer instructions for performing the steps recited in anyone of claims 13–18.

* * * * *